March 18, 1969     M. M. SEELOFF     3,433,388
WORKPIECE FEEDER HAVING MAGAZINE ESCAPEMENT MEANS
Filed July 12, 1967
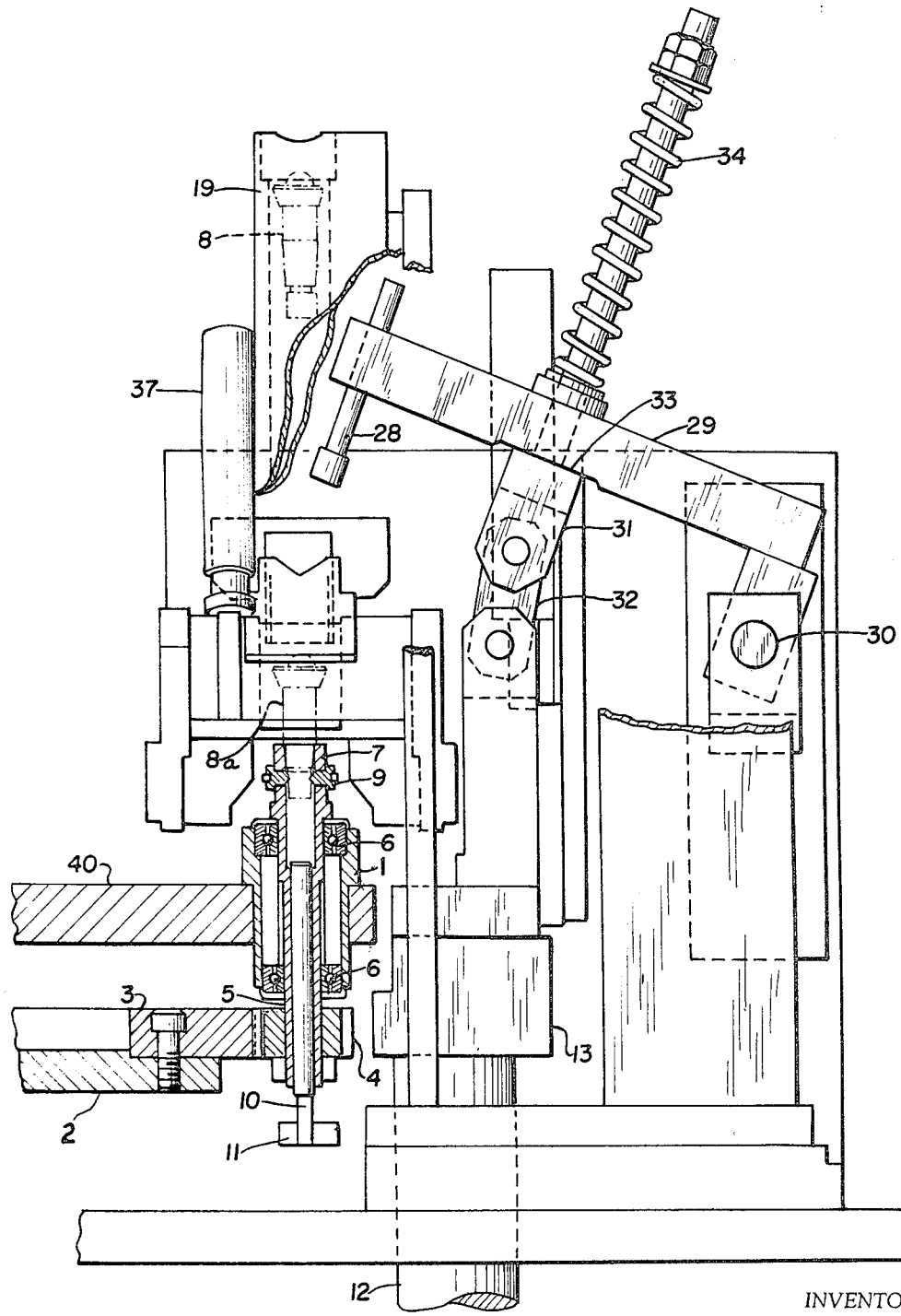
Fig.1
INVENTOR.
MELVIN M. SEELOFF
BY
ATTORNEY

INVENTOR.
MELVIN M. SEELOFF

United States Patent Office 3,433,388
Patented Mar. 18, 1969

3,433,388
WORKPIECE FEEDER HAVING MAGAZINE ESCAPEMENT MEANS
Melvin M. Seeloff, Warren, Ohio, assignor to The Taylor-Winfield Corporation, Warren, Ohio
Filed July 12, 1967, Ser. No. 652,905
U.S. Cl. 221—274
Int. Cl. B65g 47/06
7 Claims

ABSTRACT OF THE DISCLOSURE

The present invention relates to an automatic feeder especially useful in processes for feeding, loading and processing irregularly shaped workpieces. The feeder involves an escapement mechanism for selectively moving the workpieces from a loading position to a free-falling position so as to be automatically fed into spaced work holding fixtures which may be mounted on a rotatable table.

---

This invention relates to a novel, fool-proof, synchronized, noncritical apparatus for loading or feeding circular, irregularly shaped parts in multiple station, rotating or reciprocating types of work conveyors where the work holding fixtures may or may not be required to rotate.

In the illustrative embodiment of the invention specifically disclosed in the specification, this feeder and its allied features was designed for an induction heating machine where it is necessary to rotate the parts to be induction heated in order to obtain a uniform heating pattern.

The rotation of the part to be processed, commonly called the workpiece, is a simple operation when said workpieces are loaded directly into the heating station.

However, when said worqpieces are loaded remote of the heating station and carried to said heating station via a multiple station rotating table or conveyor, the problem of rotating the workpiece becomes quite difficult.

An object of the present invention is to overcome said difficulty. In conventional designs, a means for rotation of the workpiece may be provided at the heating station to engage or disengage the workpiece holding fixture. This means of rotation is usually quite complicated.

Therefore, a further object of the invention is to overcome the complication of said means.

Other problems which are usually encountered in a multiple station, rotating or reciprocating type workpiece conveyor arise from the workpiece loading and unloading mechanism. The workpiece loading mechanism will be referred to as the workpiece feeder.

A still further object of the invention is to provide means to automatically position, load and clamp the workpieces in successive stations, after which the workpieces are processed and then automatically ejected at a subsequent station.

A more specific object of the invention is to provide a processing operation consisting of heating a portion of the rotating workpiece and automatically qmenching it, for heat-treatment at the ejection station. The heating and quenching operations are well known in the art and form no part of this invention, per se.

It is also a basic requirement in fully automatic machinery of this type that the workpiece feeding mechanism be fully synchronized with the workpiece receiving mechanism.

There are many standard workpiece feeder units in common use for handling regular or uniform shapes, such as rounds, squares, bolts, nuts, washers, etc. Workpieces of irregular shape are sometimes very difficult to feed and require a specially designed feeder.

Another and more specific object of the invention is to provide a feeder involving a novel escapement mechanism for feeding workpieces of irregular shape; also for rapidly positioning said workpiece and pushing it into a rotatable, clamp type of workpiece holding fixture.

Other objects and advantages of the invention will become more apparent from a study of the following description together with the accompanying drawings wherein:

*Brief description of drawings*

FIG. 1 is an elevational view of a feeder mechanism, shown partly in section and embodying the present invention;

Figure 2:
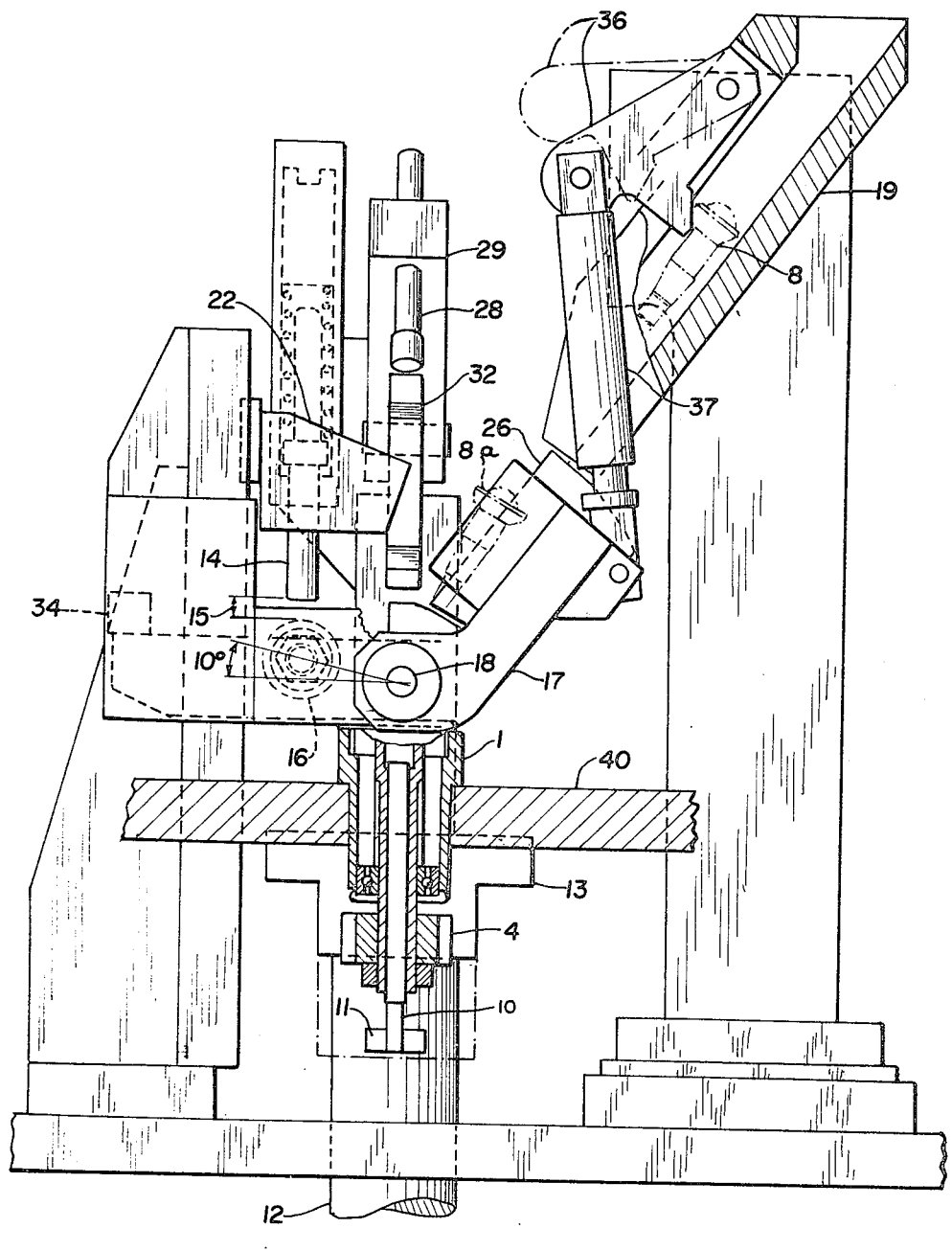
FIG. 2 is a similar view taken from the left of FIG. 1.

Referring more particularly to FIG. 1 of the drawing, numeral 40 denotes a segment of a rotating indexing table upon which is mounted multiple workpiece holding fixtures, denoted by numeral 1. Mounted on a stationary support 2 is a circular ring gear 3 which is also stationary. Ring gear 3 is in constant mesh with pinion gear 4 on each of the multiple workpiece holding fixtures. Gear 4 is keyed to shaft 5, said shaft being supported in and by anti-friction bearings 6. The top portion of shaft 5 is bored to a taper to generally fit a matching taper on the workpiece, denoted by numeral 8, to be processed. The taper determines the depth that the workpiece enters the fixture. Spring biased plungers 9 clamp against the lower portion of the workpiece 8 in order to keep said workpiece from being misplaced from proper position because of the magnetic pull of the induction heating coil during the heating operation.

Shaft 5 is hollowed out its full length to admit an ejecting pin 10 on which is fastened a combination striking plate and stop 11. After the workpieces have been inductively heated they are successively moved to a work ejection station where a synchronized plunger strikes the plate 11 forcing pin 10 upwardly to forcibly eject the workpiece into a quenching bath (not shown) to give it its required heat treatment.

It should be noted that table 40 is of the indexing type where each of its multiple workpiece holding fixtures stops successively at the feeding and ejecting stations.

It will be readily seen that whenever table 40 is moving, the workpiece holding spindles 5 are rotating because their integral pinion gears 4 are in constant mesh with ring gear 3 which is stationary.

Hence, spindles 5 are at rest (nonrotating) when indexing table 40 is in its dwell position at the feeding and ejecting stations.

Because of its unusual shape, the workpiece 8 to be processed, shown in dash-dot outline, was very difficult to automatically feed. The present invention provided a way to do this by uniquely combining several escapement mechanisms and allied components as more fully described below.

In synchronism with the rotation of the table 40 is a reciprocating shaft 12 which is the prime mover and synchronizer of the complete feed mechanism. Mounted on top of shaft 12 is a bracket 13 which carries a spring-biased plunger 14. After a certain amount of free movement of plunger 14 (between the positions shown in FIGS. 2 and 3 as indicated by gap 15), said plunger contacts roller 16 supported in escapement lever 17 which pivots about pivot point 18 until said lever abuts against stop 39. Any slight overtravel of plunger 14 after lever 17 has contacted stop 39 will be compensated for by the spring biasing of plunger 14.

Figure 3:
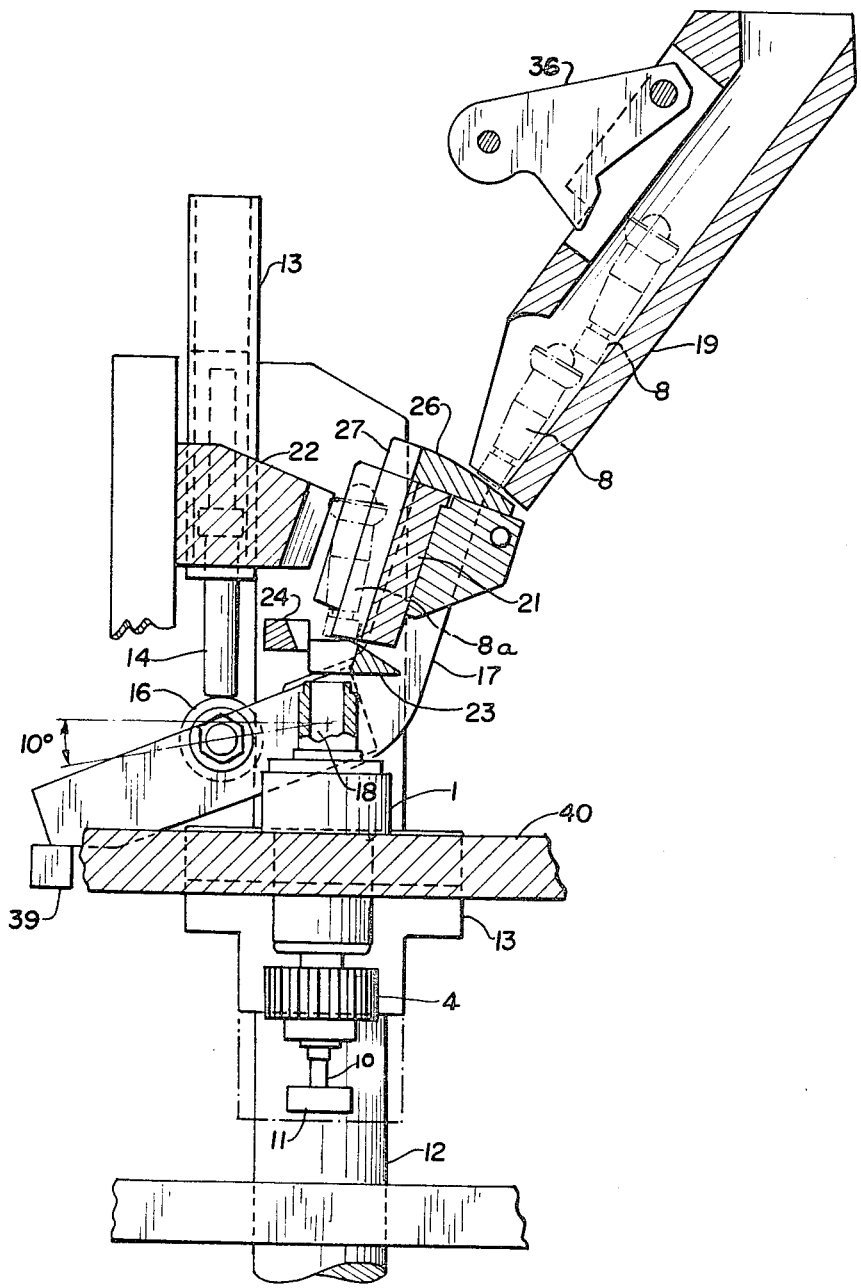
FIG. 3 is a view similar to FIG. 2 but with part 37 omitted and showing a different position of the escapement mechanism.
Figure 4:
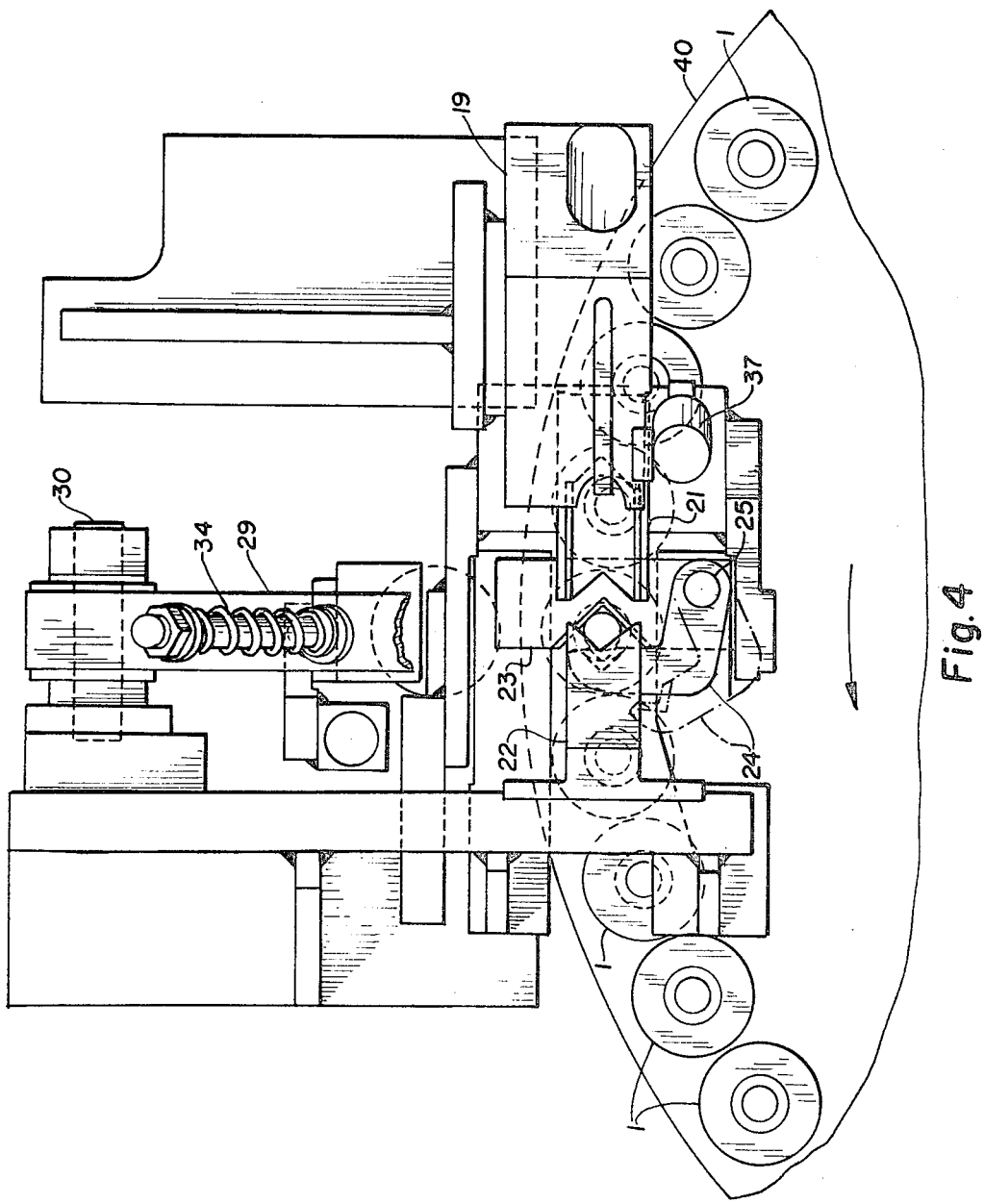
FIG. 4 is a fragmentary top or plan view of the apparatus shown in FIGS. 1, 2 and 3.

Escapement lever 17 is the medium which moves a workpiece, such as 8, from the inclined magazine 19, which is constantly being fed manually or by a standard hopper unit, into the semi-guided, "free-falling" position indicated by numeral 8a in FIG. 3. This "free-falling" is the paramount idea on which the present invention is based. Note the relative positions of magazine 19 and lever 17 in FIGS. 2 and 3 resulting from operation of the escapement mechanism.

V-guides 21, 22, 23 and 24 are strategically located in such positions as to freely guide the end of the "free-falling" workpiece into the work receiving cavity of spindle or shaft 5. V-block 21 is rigidly mounted in escapement lever 17. V-blocks 22 and 23 are held in fixed positions on stationary members of the machine proper. V-block 24 is in the form of a spring biased swinging link mounted on a stationary member of the machine and pivoted at point 25. It is pivoted in order that the loaded workpieces can move the V-block out of position during the rotation of the table. Immediately after one workpiece passes this swinging V-block, a spring moves it back into position for the loading of the next fixture. This is the most important of the V-blocks. By inclining the magazine 19 and the V-blocks 21, 23 and 26, the workpieces 8 will always ride the bottom of the V's thus insuring consistant location.

Mounted on the top surface of escapement lever 17 (see FIG. 3) is a workpiece retaining plate 26 which is also provided with a V 27 which is in coincidental alignment with the V in block 21. The purpose of this plate is to hold back the succeeding workpieces 8 while one workpiece 8a is moved to the "free-falling" position as indicated in FIGS. 1 and 3.

It can readily be seen in FIG. 3 that with magazine 19 in an inclined position, the space above the workpiece 8 when in position 8a, is free of any obstructions. This space was designed into the unit to provide free access for the plunger 28 to spring biasedly come into contact with the spherical radius of the workpiece 8a and thus force said workpiece past the spring-biased plungers 9 and into its seat at 7.

This operation is done in synchronism with the plunger 14 being that both are directly mounted on bracket 13 which is rigidly fastened to reciprocating rod 12.

Plunger 28 is adjustably mounted in lever 29 which is pivoted at pivot point 30 mounted on a stationary part of the machine. The centerline of plunger 28 coincides with the centerline through the workpiece holding fixtures 1 when in the loading position. The upward stroke of plunger 28 is such that the gap between the end of said plunger and the top of the workpiece holding fixture is of sufficient magnitude to allow workpiece 8 to assume the position 8a without interference.

Also mounted on lever 29 is spring-biased, clevised rod 31 which is indirectly fastened to the reciprocating rod or shaft 12 and its bracket 13 by means of pivoting link 32. The spring biasing of lever 29 is to provide a definite pressure for the seating of the workpiece in the fixture cavity, also to provide a safety overtravel of the rod 31 should the workpieces vary in length of the machine malfunctions. Actually at the point of the workpiece seating, a gap is established at 33 thus allowing the spring 34 to exert a definite preset pressure on the lever 29.

Upon reversal of the reciprocating rod 12, the plunger 14 (see FIG. 3) moves away from roller 16 thus allowing spring-biased escapement lever 17 to assume the position as shown in FIG. 2 which position is governed by stop 34. In this position, workpiece 8a falls into the escapement, as shown. Just prior to lever 17 reaching the position shown in FIG. 2, a second escapement 36 is automatically moved into position, since it is directly connected to first mentioned escapement by means of the spring-biased link 37. Here again the spring biasing is furnished as a safety means should malfunctioning occur.

Escapement 36, positioned as shown in FIG. 2, restrains workpiece 38 and succeeding workpieces so that only one workpiece 8a (FIG. 3) will be free to fall into escapement lever 17 with each pivotal operation of said escapement lever.

From the above description it will be apparent that for high speed production, it is imperative that the numerous movements of all components be mechanically synchronized to prevent machine malfunction. It is also apparent that a feeding mechanism that allows "free-falling" of the workpieces into the positioning cavity eliminates the need for costly, accurate alignment of feeder and workpiece holding fixture.

Thus it will be seen that I have provided an efficient automatic feeder which is particularly useful for irregularly shaped workpieces and which includes a very unique escapement mechanism which eliminates the necessity for accurate alignment of the feeder and workpiece holding fixture.

I claim:

1. A workpiece feeder comprising a plurality of workpiece holders sequentially movable to a vertical, predetermined feeding position, an inclined magazine thereabove for loading and storing a plurality of workpieces in end-to-end relationship, an escapement mechanism including an escapement lever pivotally mounted immediately below said magazine and above said feeding position, said lever containing a track portion which is periodically moved, by said escapement mechanism, into and out of alignment with said magazine substantially vertically so as to sequentially feed only one of the workpieces at a time, on end by gravity, into said lever for subsequent gravity feeding thereof, on end, into one of said workpiece holders located at said feeding position.

2. A workpiece feeder as recited in claim 1 together with a main frame for said feeder, V-shaped blocks in said magazine, on said main frame and on said lever for providing a V-shaped track for gravity sliding movement and location of the workpieces.

3. A workpiece feeder as recited in claim 1 together with a workpiece restraining escapement, means for pushing the workpiece into its holder, and a reciprocating shaft for synchronizing the movements of said escapement and said means.

4. A workpiece feeder as recited in claim 3 wherein said means comprises a spring-cushioned plunger.

5. A workpiece feeder as recited in claim 1 wherein said lever is pivotally movable to an angle such as to allow free fall into said holder of the workpiece held in said lever, thereby eliminating the necessity of precise alignment between the feeder and holder and wherein a stop means is provided on top of said lever for preventing feeding of workpieces when the lever is out of alignment with said magazine.

6. A workpiece feeder comprising a stationary ring gear, a plurality of spaced pinions in constant mesh with said gear, a workpiece receiving fixture mounted on each of said pinions, spring means on said fixture for yieldably holding the workpiece, an indexing table located above and concentrically with said ring gear, and peripherally spaced bearing means carried by said table and in which fixtures are mounted, whereby when said table stops rotating during its dwell periods for loading and ejection, said fixtures also stop rotating so as to facilitate ejection of the workpieces, and a plunger movable substantially vertically in synchronism with said table for forcing the workpiece into its fixture against the action of said spring means.

7. A workpiece feeder as recited in claim 6 together with an ejection pin which extends through each pinion and workpiece receiving fixture and wherein said plunger is spring biased.

References Cited

UNITED STATES PATENTS

| 2,042,502 | 6/1936 | Bullard | 269—57 |
| 2,369,269 | 2/1945 | Turner | 221—294 |
| 3,066,826 | 12/1962 | Ullman et al. | 221—175 |

STANLEY H. TOLLBERG, *Primary Examiner.*

U.S. Cl. X.R.

269—57